United States Patent Office 2,868,822
Patented Jan. 13, 1959

2,868,822
CHEMICAL PROCESS

Edwin L. Mattison, Newark, Del., assignor to E. I. du Pont de Nemours and Company, Wilmington, Del., a corporation of Delaware No Drawing. Application October 31, 1955
Serial No. 544,066

3 Claims. (Cl. 260—437)

This invention relates to chemical processes, and more particularly to a process for preventing the agglomeration of lead residues in the manufacture of tetraethyl lead.

In the manufacture of tetraethyl lead by the reaction of ethyl chloride with sodium lead alloy, a large amount of the lead originally used in the process must be recovered as lead. In this process the sodium lead alloy (of the composition NaPb) is reacted with an excess of ethyl chloride, resulting in a reaction mass containing the tetraethyl lead, unused ethyl chloride, sodium chloride, metallic lead and small portions of unreacted sodium lead alloy. In the recovery of the tetraethyl lead and the ethyl chloride, this reaction mass is steam distilled and in this step serious difficulties have been encountered, for during the steam distillation the finely divided metallic lead agglomerates, eventually forming large intractable masses which are very troublesome to remove from the stills. In the usual batch operation it has been the practice to add various compounds known as "still-aids," which are usually added to the water in which the reaction mass is drowned prior to steam distillation. These still-aids, such as sodium dichromate and sodium thiosulfate, have worked satisfactorily in the batch process, but, with the advent of the continuous process of steam distillation using, for example, high speed turbannular flow stripping followed by separation of the vapors from the lead slurry in a cyclone separator, as more particularly described in U. S. Patent 2,678,907, it has been found to be extremely difficult to feed the still-aids and the reaction mass in such a manner that the still-aids are uniformly incorporated throughout the distillation mass. Where this mixing is complete and thorough, entirely satisfactory results are obtainable. Trouble from agglomeration, however, arises if there is a deficiency of still-aid even for a short time in the flow through the turbannular stripper. Poor mixing seems to cause the undesirable agglomeration, particularly when the reaction mass contains an undue amount of unreacted sodium lead alloy. Since the still-aids previously employed have been water-soluble compounds which have been added to the still, complete mixing or contact of these still-aids with the unreacted lead is inevitable during the distillation. These water-soluble still-aids, however, cannot be conveniently introduced into the reaction mass at the high pressures necessary for the continuous turbannular stripping operation which is carried out. It is desirable that the still-aid be introduced as a liquid. Where sludging occure in the operation in the turbannular stripping tubes, apparently the aqueous solution of the still-aid at that point is not sufficient to prevent agglomeration of the lead residues and agglomeration in the tubes and plating of the lead in the cyclone separator are sometimes experienced.

It is therefore an object of the present invention to provide an effective still-aid which will prevent agglomeration of the residual lead in the distillation of the tetraethyl lead and ethyl chloride from the tetraethyl lead reaction masses, and which is particularly suitable for use in the continuous process wherein distillation is carried out in a turbannular flow stripper. It is a more particular object of the invention to provide a still-aid which can be employed in liquid form and which can be thoroughly mixed with the residual lead prior to distillation of the tetraethyl lead mass, but which does not require the use of water to put it in liquid form.

Ordinarily in the continuous process in the manufacture of tetraethyl lead, the sodium lead alloy and ethyl chloride are reacted at temperatures of from 100 to about 125 degrees C. and the reaction mass flows directly from the reactor to a hold tank where it is maintained at approximately the same temperature, from which hold tank it passes to the turbannular stripper where the tetraethyl lead and ethyl chloride are separated from the lead residues and other known volatile materials. This reaction mass is thus fed to the turbannular stripper together with water and steam and with the previously known still-aid dissolved in the water.

It has now been found that, if sulfur is added to the reaction mass either in the hold tank or even during the reaction of the sodium lead alloy with ethyl chloride, the mass can be steam distilled in the continuous turbannular stripper without the agglomeration of residual lead either in the turbannular stripper or in the cyclone separator and connecting passageways through which it ultimately passes. Since sulfur is liquid at the temperatures of the reaction or at the temperatures at which the reaction mass is held in the hold tank in which the mass is normally agitated, it can be thoroughly mixed with the reaction mass and apparently forms on the lead particles a very thin film of lead sulfide which prevents agglomeration of the lead particles during the distillation operation. The amount of lead sulfide formed has been found to be negligible in that it does not materially reduce the yield of tetraethyl lead from any given amount of sodium lead alloy.

The introduction of the sulfur may be at any step prior to the introduction of the water into the reaction to effect steam distillation. It will be obvious that this new still-aid may be employed in either the batch or the continuous process in which it has been found to entirely prevent agglomeration of the lead particles during the distillation step. The preferred amounts of sulfur to be employed may vary between 0.02% and 0.35%, based on the weight of the sodium lead alloy used in the reaction. Even smaller amounts will be found to be operable, although large excesses merely add needless expense to the process.

The following example is given to more fully illustrate the invention.

Example

Granulated sodium lead alloy of the composition NaPb (45 parts by weight) was agitated in an autoclave with 100 parts by weight of liquid ethyl chloride, containing 0.3 part of acetone, for 10 minutes at 120 degrees C. The autoclave was then cooled, and after adding 0.02 part of sulfur (0.044% of the alloy), was heated again at 120 degrees for 5 minutes with agitation to dissolve the sulfur. The reaction mass was cooled, the autoclave was opened, and the ethyl chloride was allowed to boil off. The remaining reaction mass was dumped into water and distilled with steam, removing tetraethyl lead and residual ethyl chloride. The lead in the reaction mass formed fine black particles which showed no tendency to agglomerate during the distillation. When no longer agitated by the introduction of the steam these particles settled rapidly without leaving "fines" in suspension. No signs of undesirable agglomeration were observed at any time in four identical runs, even when unreacted alloy was added, which is known to accelerate agglomeration. The tetraethyl lead isolated was of the usual purity, obtained with sodium dichromate or sodium thiosulfate still-aid. The yield was also normal (88% to 90%).

Similar results were obtained with 0.022% and 0.35% of sulfur, based on the weight of alloy.

Where the reaction of the sodium lead alloy and the ethyl chloride is carried out in a continuous reactor, the same amount of sulfur used in the above illustrated batch process can be added either during the reaction or as the material is run into the hold tank, as more particularly described in U. S. Patent 2,678,907. When continuously distilled in the turbannular stripper as described in U. S. Patent 2,678,907, no agglomeration of the lead particles resulted, nor any plating in the cyclone separator.

In the continuous process for the manufacture of tetraethyl lead, the molten lead monosodium alloy is continuously quenched in from 1 to 9 parts of liquid ethyl chloride so as to produce a slurry of the lead alloy in the liquid ethyl chloride, and this slurry is caused to react at a temperature of from 100 degrees to about 125 degrees C. under a pressure of from 170 to 290 pounds in a horizontal tubular reactor agitated by blades rotating on a shaft through the axis of the reactor. The completed reaction mass flows from the reactor into an agitated hold tank from which it is introduced into the continuous turbannular stripper. The molten sulfur is preferably injected continuously into the hold tank.

I claim:
1. In the process of reacting ethyl chloride with NaPb alloy wherein the tetraethyl lead and ethyl chloride are recovered by steam distillation of the reaction mass, the step of preventing agglomeration of the residual lead particles by intimately incorporating into the reaction mass prior to the introduction of water into the reaction mass to effect steam distillation from 0.02% to 0.35% of sulfur, based on the weight of the NaPb alloy.

2. In a continuous process for the manufacture of tetraethyl lead in which NaPb alloy is reacted with an excess of ethyl chloride and the tetraethyl lead and ethyl chloride are stripped from the resulting reaction mass by passing through a turbannular flow stripper with steam, the step which comprises incorporating into the reaction mass prior to the steam distillation from 0.02% to 0.35% of sulfur, based on the weight of the NaPb alloy.

3. The process of claim 2 wherein the sulfur is added to the reaction mass in an agitated hold tank in which the mass is maintained at a temperature of from 100 to about 125 degrees C.

References Cited in the file of this patent
UNITED STATES PATENTS

| | | |
|---|---|---|
| 1,645,375 | Daudt et al. | Oct. 11, 1927 |
| 2,004,160 | Downing et al. | June 11, 1935 |
| 2,407,551 | Heron | Sept. 10, 1946 |